United States Patent [19]

Froeberg

[11] Patent Number: 6,072,431
[45] Date of Patent: Jun. 6, 2000

[54] EXTENSIBLE GPS RECEIVER SYSTEM

[75] Inventor: Peter L. Froeberg, Cupertino, Calif.

[73] Assignee: Trimble Navigation Limited, Sunnyvale, Calif.

[21] Appl. No.: 08/969,632

[22] Filed: Nov. 13, 1997

[51] Int. Cl.[7] .............................. H04B 7/185; G01S 5/02
[52] U.S. Cl. ................................ 342/357.12; 701/213
[58] Field of Search ......................... 342/357.06, 357.12; 701/213

[56] References Cited

U.S. PATENT DOCUMENTS

| | | | |
|---|---|---|---|
| 5,576,716 | 11/1996 | Sadler | 342/457 |
| 5,757,916 | 5/1998 | MacDoran et al. | 380/25 |
| 5,922,073 | 7/1999 | Shimada | 713/200 |
| 5,928,306 | 7/1999 | France et al. | 701/207 |

*Primary Examiner*—Theodore M. Blum
*Attorney, Agent, or Firm*—Blakely, Sokoloff, Taylor & Zafman LLP

[57] ABSTRACT

An extensible Global Positioning System (GPS) receiver system is described. The receiver system isolates user application processing from time critical GPS acquisition and tracking processing in order to insure that GPS acquisition and tracking processing is timely performed. Thus user application processing can be developed without concern of conflict with GPS acquisition and tracking processing.

16 Claims, 12 Drawing Sheets

| CLASS GPS.ROUTEPOINT | |
|---|---|
| METHODS | |
| -getLat | public double getLat () |
| -getLon | public double getLon () |
| -getTime | public int getTime () |
| -getRadius | public int getRadius () |
| -getEarlyThreshold | public int getEarlyThreshold () |
| -getLateThreshold | public int getLateThreshold () |
| -getDistance | public double getDistance() |
| -getIndex | public int getIndex () |
| -setTime | |
| -setRadius | public void setRadius (int radius) |
| -setEarlyThreshold | public void setEarlyThreshold (int early) |
| -setLateThreshold | public void setLateThreshold (int late) |
| -setDistance | public void setDistance (double distance) |

Fig. 3a

| CLASS GPS.ROUTEPOINT | | |
|---|---|---|
| METHODS | | |
| - setIndex | public void setIndex (int index) | |
| -toString | public String toString () Overrides: toString in class Object | |

Fig. 3b

| CLASS GPS.GPSTIME | |
|---|---|
| VARIABLES | |
| - SECS_PER_WEEK | public static final int SECS_PER_WEEK |
| - SECS_PER_DAY | public static final int SECS_PER_DAY |
| - SECS_PER_HOUR | public static final int SECS_PER_HOUR |
| - SECS_PER_MINUTE | public static final int SECS_PER_MINUTE |
| - MINS_PER_HOUR | public static final int MINS_PER_HOUR |
| - HOURS_PER_DAY | public static final int HOURS_PER_DAY |
| - DAYS_PER_WEEK | public static final int DAYS_PER_WEEK |

Fig. 4a

| | CLASS GPS.GPSTIME | |
|---|---|---|
| | CONSTRUCTORS | |
| -GPStime | public GPStime () | Constructs a GPStime object with the current date and time |
| -GPStime | public GPStime (int yyyy, int m, int d) | Constructs a specific GPStime given only the date<br>Parameters:<br>yyyy - year (full year, e.g., 1996, not starting from 1900)<br>m - month (1-12)<br>d - day (1-31)<br>Throws: IllegalArgumentException<br>if yyyy/m/d h:min:s.ss not a valid date/time |
| -GPStime | public GPStime (int yyyy, int m, int d, int h, int min, float s ) | Constructs a specific GPStime given only the date & time<br>Parameters:<br>yyyy - year (full year, e.g., 1996, not starting from 1900)<br>h - hour (range 0-23)<br>min - minute (range 0-59)<br>s - second (range 0-59.999...)<br>Throws: IllegalArgumentException<br>if yyyy/m/d h:ss.ss not a valid date/time |

Fig. 4b

| CLASS GPS.GPSTIME | | |
|---|---|---|
| CONSTRUCTORS, cont. | | |
| -GPStime | public GPStime (short week_tag, float time_tag) | Constructs a specific GPStime given the GPS week/second tags. This method corrects for UTC leap seconds and performs GPS week rollover checking according to the current rollover threshold currently in effect<br>Parameters:<br>week_tag - GPS week number (range 0 to 1023)<br>time_tag - Seconds into the GPS week (not adjusted for UTC) |

Fig. 4c

CLASS GPS.GPSTIME

| | METHODS | |
|---|---|---|
| -advanceDay | public void advanceDay (int n) | Advance by n days. For example . d.advanceDay(30) adds thirty days to d<br>Parameters:<br>  n - the number of days by which to change this (n can be < 0) |
| -advanceSecond | public void advanceSecond (float n) | Advance the time by n 'seconds'. For example. d. advanceSecond(30)adds thirty seconds to d<br>Parameters:<br>  n - the number of seconds by which to change this day (can be < 0) |
| -getSecond | public float getSecond () | Gets the second of the minute<br>Returns:<br>  the second of the minute (range 0 to 59.999....) |
| -getMinute | public int getMinute () | Gets the minute of the hour<br>Returns:<br>  the minute of the hour(range 0 to 59) |
| -getHour | public int getHour () | Gets the hour of the day<br>Returns:<br>  the hour of the day (range 0 to 23) |

| CLASS GPS.GPSTIME | | |
|---|---|---|
| METHODS cont. | | |
| -getDay | public int getMinuteDay () | Gets the day of the month<br>Returns:<br>the day of the month (range 0 to 31, month dependent) |
| -getMonth | public int getMonth () | Gets the month<br>Returns:<br>the month (range 1 to 12) |
| -getYear | public int getYear () | Gets the year<br>Returns:<br>the year (counting from 0, not 1900) |
| -weekday | public int weekday () | Gets the weekday<br>Returns:<br>the weekday (0 = Sunday, 1= Monday, ..., 6 = Saturday) |
| -daysBetween | public int daysBetween (GPStime b) | The number of days between this and GPStime parameter<br>Parameters:<br>b - any GPStime<br>Returns:<br>the number of days between this and GPStime parameter and b (>0 if this day comes after b) |

Fig. 4f

| CLASS GPS.GPSTIME | | |
|---|---|---|
| METHODS cont. | | |
| -secsBetween | public double secsBetween (GPStime b) | The number of seconds between this and GPStime parameter<br>Parameters:<br>b - any GPStime<br>Returns:<br>the number of seconds between this and GPStime parameter and b (>0 if this comes after b) |
| -getWeek_tag | public short getWeek_tag () | Get the GPS week_tag<br>Returns:<br>the GPSweek_tag value (aliased to lie from 0 - 1023) |
| -getTime_tag | public float getTime_tag () | Get the GPS time_tag<br>Returns:<br>theGPStime_tag value (offset from UTC by GPS leap seconds) |
| -convertGPStimetag | public void convertGPStimetag (short week_tag, float time_tag) | Set this GPStime to the GPS week/seconds tags. This method corrects for UTC leap seconds and performs GPS week rollover according to the current rollover threshold currently in effect<br>Parameters:<br>week_tag - GPS week number (range 0 to 1023)<br>time_tag - Seconds into the GPS week (not adjusted for UTC) |

CLASS GPS.GPSTIME

METHODS cont.

| | | |
|---|---|---|
| -toString | public String toString () | A string representation of the day<br>Returns:<br>  a string representation of the GPS date and time<br>Overrides:<br>  toString_ in class Object |
| -DurationString | public static String DurationString (int dt) | A string representation of a duration in seconds<br>Parameters:<br>  dt - Delta time in seconds<br>Returns:<br>  a string representation of the delta seconds parameter |
| -toCalendar | public Calendar toCalendar () | Convert to Java Calendar object using the default Time zone and locale GPS seconds round to the nearest integer second |
| -clone | Public Object clone () | Makes a bitewise copy of a GPStime object<br>Returns:<br>  a bitewise copy of a GPStime object<br>Overrides:<br>  clone_ in class Object |
| -main | public static void main (String args []) | |

Fig. 4g

CLASS GPS.GPSFIX

| | METHODS |
|---|---|
| -clone | public Object clone ()<br>Makes a bitwise copy of a GpsFix object<br>Returns:<br>    a bitwise copy of a SimFix object TBD: sub-objects must also support cloning and be explicitly cloned here.<br>Overrides:<br>    clone in class Object |
| -getDGPSflag | public boolean getDGPSflag ()<br>Get the Differential GPS status of the current fix. A TRUE value may be either 2D or 3D. |
| -GetLatitude | public double GetLatitude ()<br>Get the latitude in degrees referenced to WGS-84 Positive values indicate northern hemisphere. Negative values indicate southern hemisphere. |
| -GetLongitude | public double GetLongitude ()<br>Get the longitude in degrees referenced to WGS-84 Negative values indicate western hemisphere. Positive values indicate eastern hemisphere. |
| -GetAltitudeMSL | public double GetAltitudeMSL ()<br>Get the altitude in meters above the geoid (mean sea-level) |
| -getAltitudeWGS84 | public double getAltitudeWGS84 ()<br>Get the altitude in meters above the WGS-84 ellipsoid. |
| -getTimeTag | public float getTimeTag ()<br>Get the GPS time tag as seconds within the GPS week. |

Fig. 5a

CLASS GPS.GPSFIX

METHODS cont.

| | | |
|---|---|---|
| -getWeekTag | public short getWeekTag () | Get the GPS week tag (0-1023) from the GPS epoch. This epoch is nominally Jan 6, 1980, but can be adjusted accordingly within the GPStime class. |
| -getTimeOfFix | public GPStime getTimeOfFix () | Return the UTC (leap-second corrected) time of current fix. |
| -AgeofFix | public double AgeOfFix () | Get the age of the current fix in seconds as compared to (GPS-corrected) system time. |
| -TimeSincePreviousFix | public float TimeSincePreviousFix (GpsFix prevfix) | Return the number of seconds between this fix and the specified (prior) fix. |
| -GetSpeed | public float GetSpeed () | Return the horizontal speed in meters per second. |
| -GetHeading | public float GetHeading () | Return the current "course" in degrees clockwise from the true north. |
| -GetVspeed | public float GetVspeed () | Return the vertical speed in meters per second. |
| -equals | public boolean equals (GpsFix f) | Return true if fixes are equal. |
| -print | public void print (String s) | |
| -print | public void print () | |

Fig. 5b

EXTENSIBLE GPS RECEIVER SYSTEM

BACKGROUND OF THE INVENTION

1. Field of the Invention

The present invention relates to a mechanism for processing positioning signals such as those received from the Global Positioning System (GPS).

2. Art Background

The global positioning system (GPS) has become extremely popular for a number of applications. GPS receivers are now incorporated into a variety of systems including consumer electronic systems in which the location information or time information provided by GPS supplements the other information provided by the system. Thus, more and more industries are realizing the advantages that GPS can provide.

Typically, when a customer, such as an original equipment manufacturer (OEM) develops a particular application of GPS, the GPS manufacturer generates the application code in accordance with the customer's specification. The GPS manufacturer designs and codes the user application of GPS, as the processing performed by the GPS receiver has strict timing and processing requirements that cannot be disturbed by other processing such as the user application processing. Unless carefully written, the execution of customer code can conflict with the GPS processing code. In addition, there is the danger of the user code overriding sections of memory containing the GPS processing code or GPS data used in processing. Thus, the GPS manufacturer cognizant of these restrictions carefully develops the user application code for a particular customer. This is a time consuming and costly process. It is therefore desirable to develop a system that insulates the GPS processing portion and data from the user application portion such that the user application portion has access to the positioning data generated by the GPS processing portion without the concern that the user application portion will corrupt the GPS processing portion and data of the receiver.

SUMMARY OF THE INVENTION

The apparatus and method of the present invention provides a processing system in which the processor is coupled to a Global Positioning System (GPS) receiver circuitry that receives positioning signals and, in accordance with well known GPS processing techniques, generates the positioning data for access by a user application process executing on the same processor. A firewall is established between the user application process and the GPS process. The firewall prevents the user application process from conflicting with time critical processing by the GPS process and further prevents the user application process from overriding the memory areas allocated to the GPS process.

BRIEF DESCRIPTION OF THE DRAWINGS

The objects, features and advantages of the present invention will be apparent to one skilled in the art from the following detailed description in which:

FIGS. 3a and 3b illustrate one class of GPS objects in accordance with the teachings of the present invention.

FIGS. 4a, 4b, 4c, 4d, 4e, 4f and 4g illustrate another class of GPS objects in accordance with the teachings of the present invention.

FIGS. 5a and 5b illustrate a class of GPS objects in accordance with the teachings of the present invention.

DETAILED DESCRIPTION

In the following description, for purposes of explanation, numerous details are set forth in order to provide a thorough understanding of the present invention. However, it will be apparent to one skilled in the art that these specific details are not required in order to practice the present invention. In other instances well known electrical structures and circuits are shown in block diagram form in order not to obscure the present invention unnecessarily.

Figure 1:
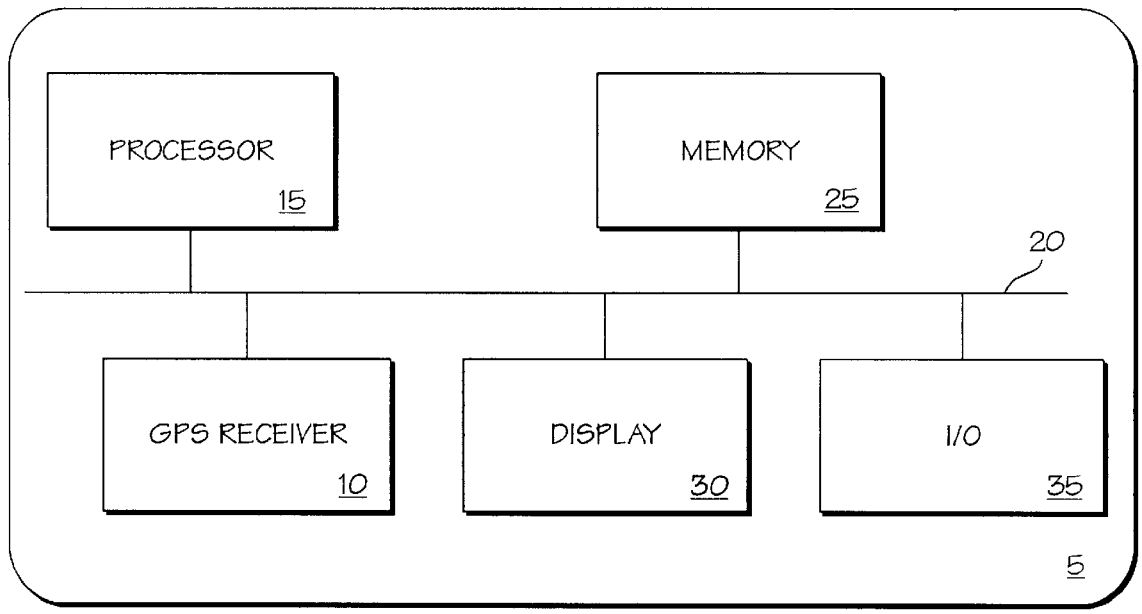
FIG. 1 is a simplified block diagram of one embodiment of the system of the present invention.

The system of the present invention provides a user configurable Global Position System (GPS) receiver system in which the user application processing does not interfere with time critical positioning processing. A simplified block diagram is shown in FIG. 1. The system and methods of the present invention are described below with reference to a GPS receiver. However, it is contemplated that the present invention can be implemented in a variety of positioning system receivers including GLONASS, Loran-C and Pseudo-lite receivers.

Referring to FIG. 1, a GPS antenna and corresponding receiver circuitry 10 is connected to processor 15 via bus 20. The processor 15 interacts with the GPS hardware such as the correlators, voltage control oscillator (VCO's) and the like, located in receiver 10 to acquire and track GPS signals transmitted by satellites. Thus, GPS receiver 10 receives GPS signals from satellites under the control of processor 15 acquires and tracks the satellites in order to receive the positioning signals. The processor 15 further processes the positioning signals to generate positioning data. Typically, the positioning data includes a time, angular and distance measurements. The specific data generated can vary according to implementation and is well known in the art. Furthermore, the control functions performed by the processor to acquire and track signals are well known in the art and will not be discussed further herein.

As is well known in the art, positioning signal processing is time critical in nature. Therefore, delays in processing the positioning signals can cause significant error in the computations. Processor 15 not only performs position signal processing, but also performs user application processing. The code and data for the user application as well as the positioning signal code and data are preferably stored in memory 25, which is coupled to processor 15 via bus 20. It is contemplated that memory 25 may also be coupled to processor 15 through a separate bus (not shown). In addition, the system includes a variety of I/O devices, such as GPS antenna/receiver 10, a display 30 and at least one user input device input device 35, such as a keyboard or mouse. The use of these I/O devices is programmable according to the user application.

Figure 2:
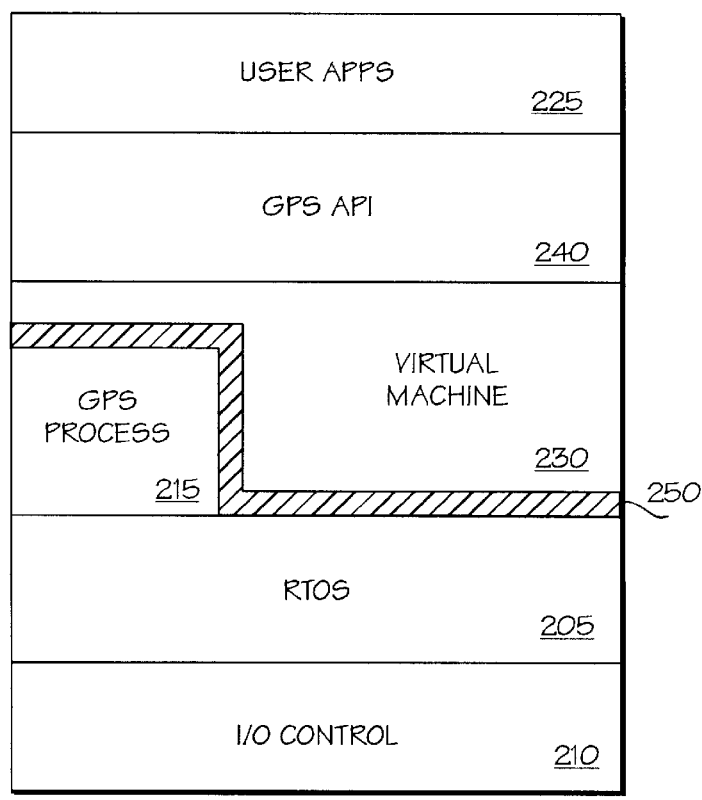
FIG. 2 is a block diagram illustrating the structure of the processes in accordance with the teachings of the present invention.

FIG. 2 is a block diagram illustrating the process structure that enables the positioning signal processing to be performed without encumbrance by the user application processing. The processor is controlled by an operating system which receives the instructions of the executing processes and controls the processor accordingly.

Although not limited as such, in the present embodiment it is preferred that a real-time operating system 205 is used to address the time critical nature of the satellite signal processing. The operating system 205 is connected to the code 210 used to control the input/output devices including the GPS receiver. One example of a real-time operating system is the Vx Works® embedded operating system marketed by WindRiver Systems. The processor processes the satellite signals in accordance with the GPS process 215. Thus, GPS process 215 interacts in the real-time manner with the real-time operating system 205 to receive positioning signals through I/O control 210 and controls the GPS receiver circuitry through I/O control 210 to accurately acquire and track the satellite signals.

As noted above it is desirable to enable the user to configure the system for the user's particular application. Therefore, in order to provide this capability, a firewall 250 is established between the GPS process 215, real-time operating system 205, and the user application 225.

In the present embodiment a virtual machine is used 230 to provide a level of protection from a user application program interfering with the data utilized in the GPS process 215. For example, the virtual machine 230 prohibits the user application process 225 from specifically accessing or corrupting a particular memory location not previously allocated to that application as the virtual machine acquires the application to address a particular memory location using a virtual address. In addition, the application process must have the privilege of accessing that particular address. Thus, virtual machine 230 provides one level of the firewall 250.

A virtual machine is a software computer that executes programs that have been compiled into byte code. As noted above, the virtual machine separates the hardware and system software from the application software. Thus, system independent applications can be developed in any language that has a compiler that generates the virtual machine byte code. Applications once complied with byte code can be downloaded and executed as any processor that executes a virtual machine. One such virtual machine, is the Java Virtual Machine, by Sunsoft, Mountain View, Calif.

The firewall 250 further is required to prohibit the user application 225 from interfering with the time critical processing of the GPS process 215. In order to protect against this potential problem, the user application processes, as executed by virtual machine 230, are set to a priority that is lower than the priority of the GPS process 215. For example, this is done by setting the priority of the GPS process to the highest priority in the operating system 205. Thus, any other process, such as the user application process will run at a lower priority, thus insuring that the GPS process 215 executes in a timely manner.

Continuing reference with FIG. 2, in the present embodiment, an application programming interface (API) 240 is provided to simplify the user task of developing the user application. The API 240 preferably includes a number of functions that are accessible by the user application. In the present embodiment, the system is programmed using object oriented technology, such as C++; alternately the Java language can be used. FIGS. 3a and 3b illustrate the Java objects for getting information to perform routing processes. FIGS. 4a–4g illustrate objects used to acquire time information from GPS signals. FIG. 5a is illustrative of GPSfix objects that can be used to get location information, i.e., a "fix". In the present embodiment, it is preferred that the GPSfix classes are constructed as class hardwarefix or simfix, wherein class hardwarefix , when initialized, includes communication between the class and the hardware. Furthermore, the object created receives data from the GPS hardware receiver. Simfix is a class of superclass GPSfix that users can instantiate to obtain a simulated GPS fix. When the class is initialized (e.g., the first time it is used), a simulator is started that propagates meaningful positions over time. Furthermore, the class includes methods to deal with simulation, e.g., defining regions and dynamics of simulated data. Simfix is used to provide an applications developer with a realistic model of GPS data.

It is readily apparent that a system developer can provide a variety of objects to address potential user applications. Thus, the user in this embodiment is further isolated from the operating system 205 through the API 240. The resulting system provides a system readily adaptable by a variety of users for a variety of applications without the concern of interference of the time critical GPS processing.

The invention has been described in conjunction with the preferred embodiment. It is evident that numerous, alternatives, modifications, variations, and uses will be apparent to those skilled in the art in light of the foregoing description.

What is claimed is:

1. A positioning system comprising:
    a receiver configured to receive positioning signals;
    a processor configured to process the positioning signals using a real time process and generate positioning data based on the processed positioning signals, the positioning data being stored in a first location specific to the real time process;
    user application code executed by the processor, said user application code configured to access the positioning data in a second location specific to the user application code, the second location being a different location from the first location; and
    a firewall established between the processor and the user application code, said firewall configured to prevent the user application code from corrupting positioning data in the first location and enables the processor to process the positioning signals in real time without interference by the user application code.

2. The positioning system as set forth in claim 1, further comprising an application programming interface (API), said API configured to access the positioning data in the second location as instructed by the user application code.

3. The positioning system as set forth in claim 2, wherein the API comprises a plurality of objects.

4. The positioning system as set forth in claim 1, wherein the processor executes a real time operating system (RTOS).

5. The positioning system as set forth in claim 1, wherein the firewall comprises a virtual machine.

6. The positioning system as set forth in claim 1 wherein the processor comprises positioning code executed by the processor and the firewall comprises setting the positioning code to a higher priority than the user application code.

7. In a positioning system, a method for processing positioning signals comprising the steps of:
    receiving positioning signals;
    processing the positioning signals using a real time process to generate positioning data, the positioning data being stored in a first location specific to the real time process;
    accessing the positioning data through a firewall using a second location that prevents an access from corrupting positioning data in the first location and interfering with the processing of the positioning signals, the second location being a different location than the first location; and
    processing the positioning data from the second location to generate user application data.

8. The method as set forth in claim 7, wherein the step of processing the positioning signals is performed using a real time operating system (RTOS).

9. The method as set forth in claim 7, wherein the firewall comprises a virtual machine, said step of accessing comprising the steps of:

issuing instructions to the virtual machine;

said virtual machine receiving the issued instructions and performing the access in accordance with the issued instructions.

10. The method as set forth in claim 7, wherein the firewall comprises the steps of processing the positioning signals at a higher priority than the accessing and processing the positioning data.

11. A computer readable medium containing executable instructions which, when executed in a processing system, causes the system to perform steps for processing positioning information, comprising:

receiving positioning signals;

processing the positioning signals using a real time process to generate positioning data, the positioning data being stored in a first location specific to the real time process;

accessing the positioning data through a firewall using a second location that prevents an access from corrupting positioning data in the first location and interfering with the processing of the positioning signals, the second location being a different location than the first location; and processing the positioning data from the second location to generate user application data.

12. The computer readable medium as set forth in claim 11, wherein the instructions further comprise a virtual machine, said step of accessing comprising the steps of:

issuing instructions to the virtual machine; and said virtual machine receiving the issued instructions and performing the access in accordance with the issued instructions.

13. The computer readable medium as set forth in claim 11, wherein the step of accessing comprises accessing the positioning data at a lower priority than processing the positioning signals.

14. The positioning system as set forth in claim 5, wherein the virtual machine provides a virtual address for the user application code to access the positioning data.

15. The method as set forth in claim 9, further comprising the step of:

providing a virtual address to access the positioning data.

16. The computer readable medium as set forth in claim 13, wherein the instructions further comprise the step of:

providing a virtual address to access the positioning data by the virtual machine.

* * * * *